(12) United States Patent
Comeau

(10) Patent No.: US 7,452,289 B2
(45) Date of Patent: Nov. 18, 2008

(54) HIGHLY NEUTRALIZED ACID POLYMER COMPOSITIONS HAVING A LOW MOISTURE VAPOR TRANSMISSION RATE AND THEIR USE IN GOLF BALLS

(75) Inventor: Brian Comeau, Berkley, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 11/468,949

(22) Filed: Aug. 31, 2006

(65) Prior Publication Data

US 2008/0058121 A1    Mar. 6, 2008

(51) Int. Cl.
*A63B 37/06* (2006.01)
(52) U.S. Cl. ........................................ 473/373
(58) Field of Classification Search ........... 473/378, 473/351, 373, 374
See application file for complete search history.

(56) References Cited

U.S. PATENT DOCUMENTS

| | | | |
|---|---|---|---|
| 5,096,201 A | 3/1992 | Egashira et al. | |
| 5,252,652 A | 10/1993 | Egashira et al. | |
| 5,306,760 A | 4/1994 | Sullivan | |
| 5,312,857 A | 5/1994 | Sullivan | |
| 5,688,191 A | 11/1997 | Cavallaro et al. | |
| 5,789,475 A | 8/1998 | Chen | |
| 5,803,831 A | 9/1998 | Sullivan et al. | |
| 5,902,855 A | 5/1999 | Sullivan | |
| 5,973,046 A | 10/1999 | Chen et al. | |
| 5,998,506 A | 12/1999 | Nesbitt | |
| 6,018,003 A | 1/2000 | Sullivan et al. | |
| 6,083,119 A | 7/2000 | Sullivan et al. | |
| 6,100,321 A | 8/2000 | Chen | |
| 6,329,458 B1 | 12/2001 | Takesue et al. | |
| 6,562,906 B2 | 5/2003 | Chen | |
| 6,565,455 B2 | 5/2003 | Hayashi et al. | |
| 6,565,456 B2 | 5/2003 | Hayashi et al. | |
| 6,592,470 B2 | 7/2003 | Watanabe et al. | |
| 6,624,221 B2 | 9/2003 | Takesue et al. | |
| 6,653,382 B1 | 11/2003 | Statz et al. | |
| 6,695,716 B2 | 2/2004 | Higuchi et al. | |
| 6,712,715 B2 | 3/2004 | Higuchi et al. | |
| 6,723,008 B2 | 4/2004 | Higuchi et al. | |
| 6,746,345 B2 | 6/2004 | Higuchi et al. | |
| 6,756,436 B2 | 6/2004 | Rajagopalan et al. | |
| 6,762,246 B2 | 7/2004 | Chen | |
| 6,777,472 B1 | 8/2004 | Statz et al. | |
| 6,815,480 B2 | 11/2004 | Statz et al. | |
| 6,838,501 B2 | 1/2005 | Takesue et al. | |
| 6,894,097 B2 | 5/2005 | Takesue et al. | |
| 6,953,820 B2 | 10/2005 | Statz et al. | |
| 7,037,967 B2 | 5/2006 | Chen | |
| 2003/0050373 A1 | 3/2003 | Chen | |
| 2003/0114565 A1 | 6/2003 | Chen et al. | |
| 2005/0148725 A1 | 7/2005 | Statz et al. | |
| 2005/0267240 A1 | 12/2005 | Chen | |
| 2006/0106175 A1 | 5/2006 | Rajagopalan et al. | |

FOREIGN PATENT DOCUMENTS

WO    WO 00/23519        4/2000
WO    WO 01/29129 A1    4/2001

*Primary Examiner*—Raeann Trimiew
(74) *Attorney, Agent, or Firm*—Mandi B. Milbank

(57) ABSTRACT

The present invention is directed to a golf ball having at least one layer formed from a moisture resistant, highly neutralized acid polymer composition. Highly neutralized acid polymers of the present invention are produced with a cation source selected from ions and compounds of lithium, ions and compounds of zinc, and combinations thereof. Golf balls of the present invention include one-piece, two-piece, multi-layer, and wound golf balls. The composition may be present in any one or more of a core layer, a cover layer, or an intermediate layer.

3 Claims, No Drawings

HIGHLY NEUTRALIZED ACID POLYMER COMPOSITIONS HAVING A LOW MOISTURE VAPOR TRANSMISSION RATE AND THEIR USE IN GOLF BALLS

FIELD OF THE INVENTION

The present invention is directed to moisture resistant compositions comprising a highly neutralized acid polymer, and to the use of such compositions in golf balls. Highly neutralized acid polymers of the present invention are prepared with a cation source selected from ions and compounds of lithium, ions and compounds of zinc, and combinations thereof.

BACKGROUND OF THE INVENTION

Golf ball core and cover layers are typically constructed with polymer compositions including, for example, polybutadiene rubber, polyurethanes, polyamides, ionomers, and blends thereof. Ionomers, particularly highly neutralized ionomers, are a preferred group of polymers for golf ball layers because of their resilience, durability, and wide range of hardness values. However, conventional highly neutralized ionomers are hydrophilic, due to the highly hydrophilic nature of the cation sources traditionally used to neutralize the ionomers, e.g., magnesium and magnesium salts of fatty acids. As a result of their hydrophilic nature, conventional highly neutralized ionomers can absorb a significant amount of moisture, e.g., 2,000 to 10,000 parts per million (ppm), which can result in processing difficulties, such as creating voids in the part during an injection molding process, and a reduction in golf ball performance, such as decreased coefficient of restitution and stiffness due to the plasticization of ionic aggregates by water molecules.

Therefore, a desire remains for compositions containing highly neutralized acid polymers having improved moisture vapor transmission properties. The present invention describes such compositions and the use thereof in a variety of golf ball core and cover layers.

SUMMARY OF THE INVENTION

In one embodiment, the present invention is directed to a golf ball having at least one layer formed from a moisture resistant composition comprising a highly neutralized polymer. At least 55% of the acid groups present in the composition are neutralized to salts having lithium counterions.

In another embodiment, the present invention is directed to a golf ball having at least one layer formed from a moisture resistant composition comprising a highly neutralized polymer. The highly neutralized polymer is produced by a process comprising contacting one or more acid polymers with a sufficient amount of a lithium-based cation source, in the presence of a melt flow modifier, to increase the level of neutralization of the acid polymer to 70% or higher.

In another embodiment, the present invention is directed to a golf ball having at least one layer formed from a moisture resistant composition comprising a highly neutralized polymer. The polymer is produced by a process comprising contacting ethylene/methacrylic acid/n-butyl acrylate with a sufficient amount of a lithium-based cation source to produce a partially neutralized acid polymer, and contacting the partially neutralized acid polymer with a sufficient amount of a zinc-based cation source and a melt flow modifier such that 70% or more of the acid groups present in the composition are neutralized.

DETAILED DESCRIPTION OF THE INVENTION

Golf balls of the present invention include one-piece, two-piece, multi-layer, and wound golf balls having a variety of core structures, intermediate layers, covers, and coatings. Golf ball cores may consist of a single, unitary layer, comprising the entire core from the center of the core to its outer periphery, or they may consist of a center surrounded by at least one outer core layer. The center, innermost portion of the core is preferably solid, but may be hollow or liquid-, gel-, or gas-filled. The outer core layer may be solid, or it may be a wound layer formed of a tensioned elastomeric material. Golf ball covers may also contain one or more layers, such as a double cover having an inner and outer cover layer. Optionally, additional layers may be disposed between the core and cover.

Golf balls of the present invention have at least one layer formed from a moisture resistant composition comprising a highly neutralized acid polymer. In a preferred embodiment, the layer formed from the moisture resistant composition is the outer core layer of a multi-layer golf ball.

For purposes of the present invention, a composition is "moisture resistant" if it has a moisture vapor transmission rate ("MVTR") of 8 g·mil/100 in$^2$/day or less, preferably 5 or less, more preferably 3 or less, more preferably 2 or less, and most preferably 1 or less. As used herein, MVTR is given in g·mil/100 in$^2$/day, and is measured at 20° C., according to ASTM F1249-99.

Moisture resistant compositions of the present invention comprise a highly neutralized acid polymer ("HNP") and optionally one or more additional materials including, but not limited to, organic acids and salts thereof, fillers, additives, and non-fatty acid melt flow modifiers. In a preferred embodiment, the moisture resistant compositions consist essentially of an HNP and optionally one or more additional materials selected from the group consisting of organic acids and salts thereof, fillers, additives, and non-fatty acid melt flow modifiers. Consisting essentially of, as used herein, means that the recited components are essential, while smaller amounts of other components may be present to the extent that they do not detract from the operability of the present invention.

As used herein, "highly neutralized" refers to the acid polymer after at least 70%, preferably at least 80%, more preferably at least 90%, even more preferably at least 95%, and most preferably 100% of the acid groups thereof are neutralized.

By the present invention, it has been found that when an acid polymer or a partially neutralized acid polymer is neutralized to 70% or higher using a cation source which includes lithium and/or zinc, the resulting HNP provides for compositions having improved moisture vapor transmission properties, while maintaining durability, desirable coefficient of restitution, and acceptable melt flow (e.g., a melt flow index of 0.5 g/10 min or greater).

Suitable cation sources for producing HNPs of the present invention include ions and compounds of lithium, ions and compounds of zinc, and combinations thereof. Suitable cation sources also include mixtures of lithium and/or zinc cations with other cations. Other cations suitable for mixing with lithium and/or zinc cations to produce HNPs of the present invention include, but are not limited to, the "less hydrophilic" cations disclosed in U.S. Patent Application Publication No. 2006/0106175; conventional HNP cations, such as those disclosed in U.S. Pat. Nos. 6,756,436 and 6,824,477; and the cations disclosed in U.S. Patent Application Publication No. 2005/026740. The entire disclosure of each of these references is hereby incorporated herein by reference.

While other cations may be present in the composition, the percentage of lithium and/or zinc salts in the composition is preferably 50% or higher, or 55% or higher, or 60% or higher, or 65% or higher, or 70% or higher, or 80% or higher, or 90% or higher, or 95% or higher, or 100%, based on the total salts present in the composition. The amount of cation source used is readily determined based on the desired level of neutralization.

HNPs of the present invention are salts of homopolymers and copolymers of $\alpha,\beta$-ethylenically unsaturated mono- or dicarboxylic acids, and combinations thereof. The term "copolymer," as used herein, includes polymers having two types of monomers, those having three types of monomers, and those having more than three types of monomers. Preferred acids are (meth) acrylic acid, ethacrylic acid, maleic acid, crotonic acid, fumaric acid, itaconic acid. (Meth) acrylic acid is particularly preferred. As used herein, "(meth) acrylic acid" means methacrylic acid and/or acrylic acid. Likewise, "(meth) acrylate" means methacrylate and/or acrylate. Preferred acid polymers are copolymers of a $C_3$ to $C_8$ $\alpha,\beta$-ethylenically unsaturated mono- or dicarboxylic acid and ethylene or a $C_3$ to $C_6$ $\alpha$-olefin, optionally including a softening monomer. Particularly preferred acid polymers are copolymers of ethylene and (meth) acrylic acid.

When a softening monomer is included, the acid polymer is referred to herein as an E/X/Y-type copolymer, wherein E is ethylene, X is a $C_3$ to $C_8$ $\alpha,\beta$-ethylenically unsaturated mono- or dicarboxylic acid, and Y is a softening monomer. The softening monomer is typically an alkyl (meth) acrylate, wherein the alkyl groups have from 1 to 8 carbon atoms. Preferred E/X/Y-type copolymers are those wherein X is (meth) acrylic acid and/or Y is selected from (meth) acrylate, n-butyl (meth) acrylate, isobutyl (meth) acrylate, methyl (meth) acrylate, and ethyl (meth) acrylate. More preferred E/X/Y-type copolymers are ethylene/(meth) acrylic acid/n-butyl acrylate, ethylene/(meth) acrylic acid/methyl acrylate, and ethylene/(meth) acrylic acid/ethyl acrylate.

The amount of ethylene or $C_3$ to $C_6$ $\alpha$-olefin in the acid copolymer is typically at least 15 wt %, preferably at least 25 wt %, more preferably at least 40 wt %, and even more preferably at least 60 wt %, based on the total weight of the copolymer. The amount of $C_3$ to $C_8$ $\alpha,\beta$-ethylenically unsaturated mono- or dicarboxylic acid in the acid copolymer is typically within a range having a lower limit of 1 wt %, or 3 wt %, or 4 wt %, or 5 wt %, and an upper limit of 20 wt %, or 25 wt %, or 30 wt %, or 35 wt %, based on the total weight of the copolymer. The amount of optional softening comonomer in the acid copolymer is typically within a range having a lower limit of 0 wt %, or 5 wt %, 10 wt %, 15 wt %, and an upper limit of 20 wt %, or 30 wt %, or 35 wt %, or 40 wt %, or 50 wt %, based on the total weight of the copolymer.

Particularly preferred acid polymers include, but are not limited to, Nucrel® acid copolymers, commercially available from E. I. du Pont de Nemours and Company, and Primacor® polymers, commercially available from Dow Chemical Company.

The acid polymer may be partially neutralized prior to neutralization to 70% or higher. Suitable partially neutralized acid polymers include, but are not limited to, Surlyn® ionomers, commercially available from E. I. du Pont de Nemours and Company; AClyn® ionomers, commercially available from Honeywell International Inc.; and Iotek® ionomers, commercially available from ExxonMobil Chemical Company.

Additional suitable acid polymers are more fully described, for example, in U.S. Pat. No. 6,953,820 and U.S. Patent Application Publication No. 2005/0049367, the entire disclosures of which are hereby incorporated herein by reference.

The acid polymers of the present invention can be direct copolymers wherein the polymer is polymerized by adding all monomers simultaneously, as described in, for example, U.S. Pat. No. 4,351,931, the entire disclosure of which is hereby incorporated herein by reference. Ionomers can be made from direct copolymers, as described in, for example, U.S. Pat. No. 3,264,272 to Rees, the entire disclosure of which is hereby incorporated herein by reference. Alternatively, the acid polymers of the present invention can be graft copolymers wherein a monomer is grafted onto an existing polymer, as described in, for example, U.S. Patent Application Publication No. 2002/0013413, the entire disclosure of which is hereby incorporated herein by reference.

Compositions of the present invention include an invention HNP (i.e., produced using a lithium and/or zinc cation source), and optionally include one or more additional HNPs. When included, the additional HNP can be one or more invention HNPs and/or one or more conventional HNPs (i.e., produced using a conventional cation source). The total amount of HNPs in the composition is preferably at least 30 wt %, more preferably at least 50 wt %, even more preferably from 50 wt % to 99.5 wt %, and even more preferably from 60 wt % to 98 wt %, based on the total polymeric weight of the composition. Preferably, the amount of invention HNPs present in the composition is at least 30 wt %.

Moisture resistant compositions of the present invention optionally contain one or more organic acids and/or salts thereof. Suitable organic acids are aliphatic organic acids, aromatic organic acids, saturated monofunctional organic acids, unsaturated monofunctional organic acids, multiunsaturated monofunctional organic acids, and dimerized derivatives thereof. Particularly suitable are aliphatic, monofunctional organic acids, preferably having fewer than 36 carbon atoms. Particular examples of suitable organic acids include, but are not limited to, caproic acid, caprylic acid, capric acid, lauric acid, stearic acid, behenic acid, erucic acid, oleic acid, linoleic acid, myristic acid, benzoic acid, palmitic acid, phenylacetic acid, naphthalenoic acid, and dimerized derivatives thereof. Particularly suitable organic acid salts include those produced by a cation source selected from barium, lithium, sodium, zinc, bismuth, potassium, strontium, magnesium, calcium, and combinations thereof. Suitable organic acids are more fully described, for example, in U.S. Pat. No. 6,756,436, the entire disclosure of which is hereby incorporated herein by reference.

Moisture resistant compositions of the present invention optionally contain one or more non-fatty acid melt flow modifiers, including, but not limited to, polyamides, polyesters, polyacrylates, polyurethanes, polyethers, thermoplastic polyureas, polyhydric alcohols, and combinations thereof. Additional melt flow modifiers suitable for use in compositions of the present invention include, but are not limited to, those described in U.S. Patent Application Publication No. 2006/0063893 and U.S. patent application Ser. No. 11/216,726, the entire disclosures of which are hereby incorporated herein by reference.

Moisture resistant compositions of the present invention optionally contain one or more additives and/or one or more fillers. Suitable additives include, but are not limited to, blowing and foaming agents, optical brighteners, coloring agents, fluorescent agents, whitening agents, UV absorbers, light stabilizers, defoaming agents, processing aids, mica, talc, antioxidants, stabilizers, softening agents, fragrance components, plasticizers, impact modifiers, acid copolymer wax, and surfactants. Suitable fillers include, but are not limited to, inorganic fillers, such as zinc oxide, titanium dioxide, tin oxide, calcium oxide, magnesium oxide, barium sulfate, zinc sulfate, calcium carbonate, zinc carbonate, barium carbonate, mica, talc, clay, silica, lead silicate, and the like; high specific gravity metal powder fillers, such as tungsten powder, molybdenum powder, and the like; regrind, i.e., core material that is ground and recycled; and nanofillers. Filler materials may be dual-functional fillers, for example zinc oxide (which may be used as a filler/acid scavenger) and titanium dioxide (which may be used as a filler/brightener material). Further examples of suitable fillers and additives include, but are not limited to, those disclosed in U.S. Patent Application Publication No. 2003/0225197, the entire disclosure of which is hereby incorporated herein by reference.

Moisture resistant compositions of the present invention are optionally produced by blending the HNP with one or more additional polymers, such as thermoplastic polymers and elastomers. Examples of thermoplastic polymers suitable for blending with the invention HNPs include, but are not limited to, polyolefins, polyamides, polyesters, polyethers, polyether-esters, polyether-amides, polyether-urea, polycarbonates, polysulfones, polyacetals, polylactones, acrylonitrile-butadiene-styrene resins, polyphenylene oxide, polyphenylene sulfide, styrene-acrylonitrile resins, styrene maleic anhydride, polyimides, aromatic polyketones, ionomers and ionomeric precursors, acid homopolymers and copolymers, conventional ionomers and HNPs (e.g., ionomeric materials sold under the trade names Dupont® HPF 1000 and DuPont® HPF 2000, commercially available from E. I. du Pont de Nemours and Company), rosin-modified ionomers, bimodal ionomers, polyurethanes, grafted and non-grafted metallocene-catalyzed polymers, single-site catalyst polymerized polymers, high crystalline acid polymers, cationic ionomers, epoxy-functionalized polymers, anhydride-functionalized polymers, and combinations thereof. Particular polyolefins suitable for blending include one or more, linear, branched, or cyclic, $C_2$-$C_{40}$ olefins, particularly polymers comprising ethylene or propylene copolymerized with one or more $C_2$-$C_{40}$ olefins, $C_3$-$C_{20}$ α-olefins, or $C_3$-$C_{10}$ α-olefins. Particular conventional HNPs suitable for blending include, but are not limited to, one or more of the HNPs disclosed in U.S. Pat. Nos. 6,756,436, 6,894,098, and 6,953,820, the entire disclosures of which are hereby incorporated herein by reference. Examples of elastomers suitable for blending with the invention polymers include natural and synthetic rubbers, including, but not limited to, ethylene propylene rubber ("EPR"), ethylene propylene diene rubber ("EPDM"), hydrogenated and non-hydrogenated styrenic block copolymer rubbers (such as SI, SIS, SB, SBS, SIBS, and the like, where "S" is styrene, "I" is isobutylene, and "B" is butadiene), butyl rubber, halobutyl rubber, copolymers of isobutylene and para-alkylstyrene, halogenated copolymers of isobutylene and para-alkylstyrene, natural rubber, polyisoprene, copolymers of butadiene with acrylonitrile, polychloroprene, alkyl acrylate rubber, chlorinated isoprene rubber, acrylonitrile chlorinated isoprene rubber, polybutadiene rubber, and thermoplastic vulcanizates. Additional suitable blend polymers include those described in U.S. Pat. No. 5,981,658, for example at column 14, lines 30 to 56, and in U.S. Patent Application Publication No. 2005/0267240, for example at paragraph [0073], the entire disclosures of which are hereby incorporated herein by reference. The blends described herein may be produced by post-reactor blending, by connecting reactors in series to make reactor blends, or by using more than one catalyst in the same reactor to produce multiple species of polymer. The polymers may be mixed prior to being put into an extruder, or they may be mixed in an extruder.

In order to be processable, moisture resistant compositions of the present invention have a melt flow index of 0.5 g/10 min or greater. Preferably, the melt flow index of the moisture resistant composition is within the range having a lower limit of 0.5 or 1.0 g/10 min, and an upper limit of 4.0 or 5.0 or 10.0 g/10 min.

Moisture resistant compositions of the present invention typically have a flexural modulus of from 3,000 psi to 200,000 psi, preferably from 5,000 psi to 150,000 psi, more preferably from 10,000 psi to 125,000 psi, and even more preferably from 10,000 psi to 100,000 psi. The material hardness of the composition is generally from 30 Shore D to 80 Shore D. In embodiments wherein the composition is present in a golf ball center, the composition preferably has a material hardness of from 30 Shore D to 50 Shore D. In embodiments wherein the composition is present in a golf ball cover layer, an outer core layer, or an intermediate layer disposed between the core and the cover, the composition preferably has a material hardness of from 30 Shore D to 70 Shore D. The notched izod impact strength of the moisture resistant compositions of the present invention is generally at least 2 ft·lb/in, as measured at 23° C. according to ASTM D256.

The present invention is not limited by any particular method or any particular equipment for making the moisture resistant composition. In a preferred embodiment, the composition is prepared by the following process. A masterbatch is prepared with at least one of the desired neutralizing species, preferably ZnO, LiOH—$H_2O$, or Mg(OH)$_2$, and optionally a melt flow modifier, such as a fatty acid or salt thereof, using any suitable polymer processing equipment, such as a two roll mill, Banbury mixer, Brabender mixer, or twin screw extruder Typical loadings of the reactive neutralizing species are from 15% to 80%, preferably from 20% to 60%, and more preferably from 30% to 50%. The masterbatch is optionally ground, chopped, or pelletized to a size that is similar to the pellet size of the base resin to be neutralized. The base resin is then dry blended with the amount of masterbatch necessary to achieve the desired level of neutralization. The HNP is then formed by reactive mixing of the base resin, masterbatch, and optional melt flow modifier in any suitable polymer processing equipment, including those indicated above for preparing the masterbatch. The base resin polymer may be partially neutralized prior to reactive mixing with the masterbatch.

Moisture resistant compositions of the present invention can be used in a variety of applications, including, for example, golf equipment, such as golf balls, golf shoes, and golf clubs.

Golf balls of the present invention can be wound, one-piece, two-piece, or multi-layer balls, wherein at least one layer is formed from a moisture resistant composition described herein. In golf balls having two or more layers which comprise a moisture resistant composition, the moisture resistant composition of one layer may be the same or a different moisture resistant composition as another layer. The layer(s) comprising the moisture resistant composition can be any one or more of a core layer (such as a center or an outer core layer), an intermediate layer, or a cover layer. Compositions of the present invention can be either foamed or filled with density adjusting materials to provide desirable golf ball performance characteristics.

The present invention is not limited by any particular process for forming the golf ball layers. It should be understood that the layers can be formed by any suitable technique, including injection molding, compression molding, casting, and reaction injection molding. Preferably, thermoset materials are formed into golf ball cover layers by casting or reaction injection molding and thermoplastic materials are formed into golf ball cover layers by compression or injection molding techniques.

In a preferred embodiment, the present invention provides a multi-layer golf ball having a compression molded rubber core, at least one injection or compression molded intermediate layer formed from a moisture resistant composition, and a polyurethane or polyurea outer cover layer. The moisture resistant composition comprises an HNP produced using a lithium and/or zinc cation source. Preferably, 55% or more of the acid groups present in the composition are neutralized to salts having lithium counterions. The polyurethane or polyurea outer cover layer material can be thermoset or thermoplastic. Light stable polyureas and polyurethanes are preferred for the outer cover layer material. Preferably, the rubber core composition comprises a rubber, a crosslinking agent, a filler, a co-crosslinking agent or free radical initiator, and optionally a cis-to-trans catalyst. Typical rubber materials include natural and synthetic rubbers, including, but not limited to, polybutadiene and styrene-butadiene. The crosslinking agent typically includes a metal salt, such as a zinc salt or magnesium salt, of an acid having from 3 to 8 carbon atoms, such as (meth) acrylic acid. The free radical initiator can be any known polymerization initiator which decomposes during the cure cycle, including, but not limited to, dicumyl peroxide, 1,1-di-(t-butylperoxy)3,3,5-trimethyl cyclohexane, a-a bis-(t-butylperoxy) diisopropylbenzene, 2,5-dimethyl-2,5 di-(t-butylperoxy) hexane or di-t-butyl peroxide, and mixtures thereof. Suitable types and amounts of rubber, crosslinking agent, filler, co-crosslinking agent, and initiator are more fully described in, for example, U.S. Patent Application Publication No. 2003/0144087, the entire disclosure of which is hereby incorporated herein by reference. Reference is also made to U.S. Patent Application Publication No. 2003/0144087 for various ball constructions and materials that can be used in golf ball core, intermediate, and cover layers.

In another preferred embodiment, the present invention provides a multi-layer golf ball having a solid core, an outer core layer, and a cover, wherein the outer core layer is formed from a moisture resistant composition comprising an HNP produced using a lithium and/or zinc cation source. Preferably, 55% or more of the acid groups present in the composition are neutralized to salts having lithium counterions. In a particular aspect of this embodiment, the composition has a moisture vapor transmission rate of 8 g-mil/100 in$^2$/day or less, thereby reducing the penetration of moisture into the core. In another particular aspect of this embodiment, the HNP is preferably based on an ethylene/(meth) acrylic acid copolymer, which may contain a softening comonomer. The solid core may be formed from any suitable core material, and is preferably formed from a conventional rubber selected from polybutadiene, polyisoprene, EPR, EPDM, styrenic block copolymer rubbers, butyl rubber, halobutyl rubber, copolymers of isobutylene and para-alkylstyrene, halogenated copolymers of isobutylene and para-alkylstyrene, natural rubber, copolymers of butadiene with acrylonitrile, polychloroprene, alkyl acrylate rubber, chlorinated isoprene rubber, and acrylonitrile chlorinated isoprene rubber. The diameter of the core is preferably from 1.40 inches to 1.55 inches. The cover is preferably a tough, cut-resistant material, selected from conventional golf ball cover materials based on the desired performance characteristics. The cover may comprise one or more layers, and preferably has an overall thickness of from 0.020 inches to 0.045 inches. Suitable cover materials include ionomer resins, blends of ionomer resins, thermoplastic and thermoset urethane, thermoplastic and thermoset urea, thermoplastic rubber polymers, polyethylene, and synthetic or natural vulcanized rubber, such as balata. Additional suitable core and cover materials are disclosed, for example, in U.S. Patent Application Publication No. 2005/0164810, U.S. Pat. No. 5,919,100, and PCT Publications WO00/23519 and WO00/29129, the entire disclosures of which are hereby incorporated herein by reference.

In another preferred embodiment, the present invention provides a two-piece golf ball having a core and a cover, wherein the cover is formed from a moisture resistant composition comprising an HNP produced using a lithium and/or zinc cation source. Preferably, 55% or more of the acid groups present in the composition are neutralized to salts having lithium counterions. The cover preferably has a material hardness of from 30 Shore D to 70 Shore D. The thickness of the cover is preferably from 0.020 inches to 0.350 inches, more preferably from 0.025 inches to 0.090 inches. The core is preferably a solid core formed from any suitable core material, and is preferably formed from a conventional rubber selected from polybutadiene, polyisoprene, EPR, EPDM, styrenic block copolymer rubbers, butyl rubber, halobutyl rubber, copolymers of isobutylene and para-alkylstyrene, halogenated copolymers of isobutylene and para-alkylstyrene, natural rubber, copolymers of butadiene with acrylonitrile, polychloroprene, alkyl acrylate rubber, chlorinated isoprene rubber, and acrylonitrile chlorinated isoprene rubber. In a preferred aspect of the present embodiment, the core is formed from a reaction product of a rubber, a crosslinking agent, a filler, a free radical initiator, and optionally a cis-to-trans catalyst. The diameter of the core is preferably from 1.00 inches to 1.63 inches. The core preferably has a compression of less than 100.

In another preferred embodiment, the present invention provides a two-piece or multi-layer golf ball having a center formed from a moisture resistant composition comprising an HNP produced using a lithium and/or zinc cation source. Preferably, 55% or more of the acid groups present in the composition are neutralized to salts having lithium counterions. The HNP is preferably based on an E/X/Y-type polymer, particularly ethylene/methacrylic acid/n-butyl acrylate. Preferably, the core has a material hardness of from 30 Shore D to 50 Shore D. The cover is preferably a tough, cut-resistant material, selected from conventional golf ball cover materials based on the desired performance characteristics. The cover may comprise one or more layers, and preferably has an overall thickness of from 0.020 inches to 0.045 inches. Suitable cover materials include, but are not limited to, ionomer resins, blends of ionomer resins, thermoplastic and thermoset urethane, thermoplastic and thermoset urea, thermoplastic rubber polymers, polyethylene, and synthetic or natural vulcanized rubber, such as balata.

Golf balls of the present invention generally have a coefficient of restitution ("COR") of at least 0.790, preferably at least 0.800, more preferably at least 0.805, and even more preferably at least 0.810, and a compression of from 75 to 110, preferably from 90 to 100.

For purposes of the present invention, compression is measured according to a known procedure, using an Atti compression test device, wherein a piston is used to compress a ball against a spring. The travel of the piston is fixed and the deflection of the spring is measured. The measurement of the deflection of the spring does not begin with its contact with the ball; rather, there is an offset of approximately the first 1.25 mm (0.05 inches) of the spring's deflection. Very low stiffness cores will not cause the spring to deflect by more than 1.25 mm and therefore have a zero compression measurement. The Atti compression tester is designed to measure objects having a diameter of 42.7 mm (1.68 inches); thus, smaller objects, such as golf ball cores, must be shimmed to a total height of 42.7 mm to obtain an accurate reading.

For purposes of the present invention, COR is determined according to a known procedure wherein a golf ball or golf ball subassembly (e.g., a golf ball core) is fired from an air cannon at a given velocity (125 ft/s for purposes of the present invention). Ballistic light screens are located between the air cannon and the steel plate to measure ball velocity. As the ball travels toward the steel plate, it activates each light screen, and the time at each light screen is measured. This provides an incoming transit time period inversely proportional to the ball's incoming velocity. The ball impacts the steel plate and rebounds though the light screens, which again measure the time period required to transit between the light screens. This provides an outgoing transit time period inversely proportional to the ball's outgoing velocity. COR is then calculated as the ratio of the incoming transit time period to the outgoing transit time period, $COR=T_{in}/T_{out}$.

EXAMPLES

It should be understood that the examples below are for illustrative purposes only. In no manner is the present invention limited to the specific disclosures therein.

A moisture resistant Li/Zn HNP was prepared according to the following procedure. A LiOH—H$_2$O masterbatch in ethylene/methacrylic acid/n-butyl acrylate at 50% loading was prepared in a Plasticorder mixer. Once mixed, the masterbatch was pressed into sheets and cut into pellet-sized pieces. A dry blend of the masterbatch and ethylene/methacrylic acid/n-butyl acrylate was loaded into a hopper on a twin screw extruder, and then fed into the extruder, along with zinc stearate, and reactively extruded to form the mixed cation Li/Zn HNP.

When numerical lower limits and numerical upper limits are set forth herein, it is contemplated that any combination of these values may be used.

All patents, publications, test procedures, and other references cited herein, including priority documents, are fully incorporated by reference to the extent such disclosure is not inconsistent with this invention and for all jurisdictions in which such incorporation is permitted.

While the illustrative embodiments of the invention have been described with particularity, it will be understood that various other modifications will be apparent to and can be readily made by those of ordinary skill in the art without departing from the spirit and scope of the invention. Accordingly, it is not intended that the scope of the claims appended hereto be limited to the examples and descriptions set forth herein, but rather that the claims be construed as encompassing all of the features of patentable novelty which reside in the present invention, including all features which would be treated as equivalents thereof by those of ordinary skill in the art to which the invention pertains.

What is claimed is:

1. A golf ball comprising:
   a core formed from a rubber composition and having a diameter of from 1.40 inches to 1.55 inches;
   an intermediate layer formed from a moisture resistant composition having an MVTR of 5 g-mil/100 in$^2$/day or less and comprising a highly neutralized acid polymer, wherein 55% or more of the acid groups present in the composition are neutralized to salts having lithium counterions, and the remainder of the acid groups present in the composition are neutralized to salts having zinc counterions such that 100% of all acid groups present in the composition are neutralized; and
   a cover formed from a polyurethane or polyurea composition and having a thickness of from 0.020 inches to 0.045 inches.

2. The golf ball of claim 1, wherein 65% or more of the acid groups present in the composition are neutralized to salts having lithium counterions.

3. The golf ball of claim 1, wherein the acid polymer is ethylene/methacrylic acid/n-butyl acrylate or ethylene/acrylic acid/n-butyl acrylate.

* * * * *